United States Patent [19]
Petrusek

[11] Patent Number: 5,000,908
[45] Date of Patent: Mar. 19, 1991

[54] PULSED HIGH-PRESSURE (PHP) DRAIN-DOWN OF STEAM GENERATING SYSTEM

[75] Inventor: Robert A. Petrusek, Killen, Ala.

[73] Assignee: Tennessee Valley Authority, Muscle Shoals, Ala.

[21] Appl. No.: 415,946

[22] Filed: Oct. 2, 1989

[51] Int. Cl.$^5$ .......................... G21C 19/00; F28G 9/00
[52] U.S. Cl. .................................... 376/316
[58] Field of Search ....................... 376/316, 310, 308; 165/71, 138, 186; 122/379, 397; 137/587, 588, 589

[56] References Cited

U.S. PATENT DOCUMENTS

| | | | |
|---|---|---|---|
| 3,825,060 | 7/1974 | Heller et al. | 165/71 |
| 4,261,300 | 4/1981 | Cross et al. | 376/316 |
| 4,649,019 | 3/1987 | Jawor | 376/316 |

Primary Examiner—Daniel D. Wasil
Attorney, Agent, or Firm—Robert A. Petrusek

[57] ABSTRACT

The present invention relates to intermittently introducing, under carefully controlled conditions, an inert gas, into at least the channel head primary coolant water outlet side of steam generators during the drain-down of a nuclear-powered steam generating system. Predetermined quantities of such gas are introduced into open ends of the inverted U-tubes which terminate at the tubesheet in the channel heads to thereby alleviate the propensity for formation of vacuum pockets at the tops thereof, and at the same time to provide that water columns defined severely near their tops by the water within each such tube and collectively near their bottoms by the water extending downward through the steam generator channel head, are not disrupted by the inadvertent formation of a gas/water interface formed in the general vicinity of the tubesheet and resulting from the flooding of the underside thereof with said gas. There exists a dependent and inversely proportional relationship between the pressure of gas introduction and the ratio of pulse time-on to pulse time-off in the instant gas introduction procedure, to thereby effect an optimum ratio of about 1.1 between the volume of nitrogen introduced into and the volume of water removed from such inverted U-tubes.

20 Claims, 1 Drawing Sheet

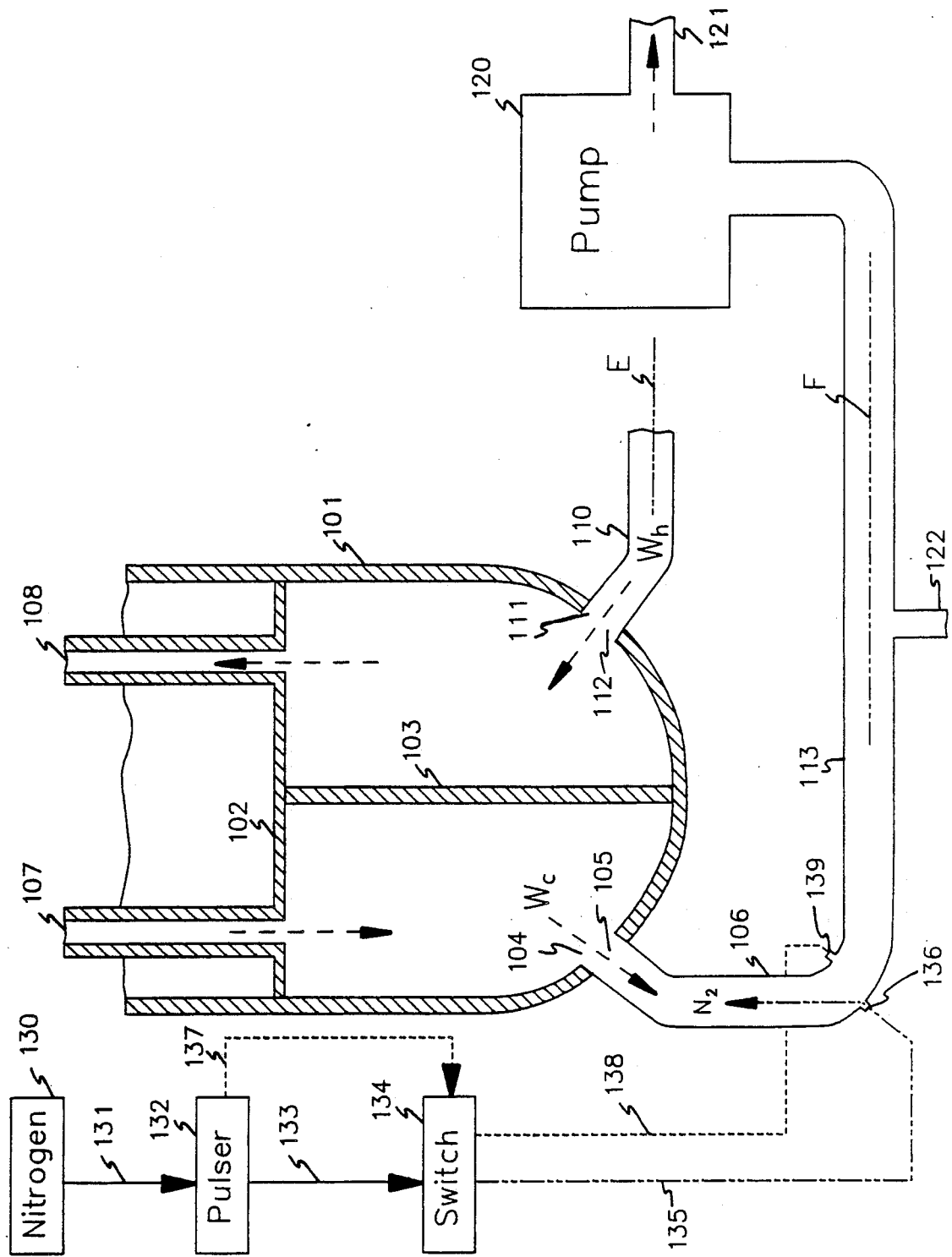

PULSED HIGH-PRESSURE (PHP) DRAIN-DOWN OF STEAM GENERATING SYSTEM

The invention herein described may be manufactured and used by or for the Government for governmental purposes without the payment to me of any royalty therefor.

INTRODUCTION

The present invention relates to a new, novel, and relatively simple and inexpensive as well as highly efficient and safe technique or method for the removal, draining down, or the lowering of the water level in certain types of steam generating units, including the types typically used in conjunction with the operation of pressurized hot-water nuclear power plants.

At periodic intervals during the operation of boiling or high-pressure water, nuclear-fired, power or propulsion systems there are necessitated the occurrence of system outages such as when refueling of the nuclear reactor is to be performed or repairs are to be effected within any of the numerous water circulating loops. During such outages, it is usual for the level of the primary coolant water within the system to be lowered to a level below that of the inlet and outlet pipes extending to and from the reactor, which pipes are typically horizontally disposed therebetween. In the vernacular of this art, such procedure is known as drain-down. More specifically, in the type of reactor system which serves several vertically disposed and inverted U-tube type steam generators, the draining down is usually effected through both the chemical volume control system and the residual heat removal system, from which the draining water is led into holdup tanks. For reasons obvious to those skilled in this art, such draining down is conducted only after the system has been cooled and depressurized by releasing steam from the steam generators, shutting down the main circulating coolant water pumps, depressurizing the pressurizer, and starting the residual heat removal pumps to actuate the residual heat removal system.

Such conventional drain-down procedure in this type of nuclear reactor system, which serves several vertical inverted U-tube type steam generators, can oftentimes be a critical path item in reducing unit down time. In the past, the time required to drain-down the primary coolant water from such systems to the level at which the steam generators have been emptied has been reported to take anywhere from about a day and a half to as much as five days, or in extreme cases seven days. This inordinate amount of time has been attributed principally to the difficulties associated with removal of water which is trapped in the plethora of relatively small diameter vertical inverted U-tubes by the vacuum pockets formed in the uppermost portions thereof. Since the vertical length of such tubes, extending above the tubesheet, may be on the order of some 35 feet, it will be appreciated that the atmospheric pressure, to which the system is exposed during drain-down, will support water columns below such vacuum pockets which are essentially the total length of each such tube. Recently, an improvement in such drain-down procedure has been suggested and involves principally the introduction of a gas which is relatively inert and nonreactive with the various innards of such steam generating systems, such as nitrogen, into any of a number of already available steam generating system introduction points in a manner so as to ensure that the nitrogen finds its way into each of the standing water columns contained in each of the individual inverted U-tubes to allegedly prevent the formation of such vacuum pockets. Such water columns may include the vertical dimensions of the divided channel head as well as a portion of the intermittent less. A principally expressed objective of this most recent improvement in the prior art is reported to be a reduction in such system drain-down time from about 32 hours to less than about 16 hours. As will become readily apparent from a further reading of the instant teachings, both the 32-hour estimate and the 16-hour estimate, supra, may be overly optimistic in both the practice of the prior art and said improvement thereover.

BACKGROUND OF THE INVENTION

1. Field of the Invention

The present invention relates to methods and means for the removal of water and the attendant lowering of the level thereof in steam generating systems and; more particularly, a new method and technique for the introduction of an inert gas, such as nitrogen, into any number of possible gas introduction points, so long as such nitrogen finds its way beneath the tubesheet and into at least one open end of each inverted U-tube thereover. said gas introduction points usually being in the lower portion of the channel heads of the type of steam generators typically used in conjunction with the operation of numerous nuclear power plants. The instant invention relates to methodologY for introducing, through any number of such introduction points, such inert gas in a manner such that it rapidly rises through the water contained in the channel head and onto the lower side of the tubesheet, which tubesheet defines a generally horizontally disposed plane comprising the upper boundary of said channel head and the terminus of said inverted U-tubes.

As noted above, during the operation of high-pressure water, nuclear-fired, power or propulsion systems there are necessitated the periodic occurrences of system outages such as when refueling is to be performed or repairs are to be effected. It is usual for the level of the primary coolant water within the system to be lowered during such outages to predetermined levels and subsequently further adjusted vertically up and down and sometimes relative to the elevation of the reactor and the level of the spent fuel holding pit, which pit normally is at an elevation higher than the fuel rods disposed within the reactor. In the type of reactor system which serves a plurality of vertical U-tube type steam generators, such draining down through the chemical volume control system and the residual heat removal system and thence into holdup tanks is conducted, of course, only after the system has been cooled and depressurized, the main circulating coolant water pumps have been shut down, the pressurizer has been depressurized, and the residual heat removal pumps have been activated to actuate the residual heat removal system.

Typically, during such drain-down procedure, a gas which is inert to the system. Such as nitrogen, is introduced into the system through the top of the system pressurizer tank to displace the water which is draining from the system. As the water is drained from the pressurizer, whose discharge flows into one of the "hot legs" or reactor outlet conduits which leads to the bottom of one of the steam generators, the nitrogen introduced through the pressurizer will eventually begin to disperse throughout the system from the bottom of said pressurizer. The nitrogen first enters the reactor above the water level therein via the reactor outlet conduit to which the pressurizer is connected, and then passes via all of the reactor inlet and outlet conduits, which are oftentimes horizontally disposed at the same elevation, to the respective steam generators and main circulating pumps in the respective steam generating loops.

As will undoubtedly become more readily apparent from a reading of the teachings of the instant invention, infra, it is inherent in the design of such systems that a total drain-down thereof would effect a lowering of the water level therein to an elevation below that desirable for the subsequent conduct of certain operations. Accordingly, it is desirable and perhaps more importantly necessary, at the appropriate stage to secure certain portions of the system against flooding during subsequent temporary raising of the water level in such system.

From an inspection of an elevational view of a system typical of the type herein referenced, it will be appreciated that the situs comprising the juxtaposition of the nozzle ring and the outlet conduit of the channel head provides a proper and convenient elevation to so secure the water level in this area of the system to ensure that maintenance work, for example, may proceed concurrently on both the primary water side and the secondary water sides thereof. A nozzle dam generally comprising a gasketed plate adapted for operative association with the nozzle ring is the usual means which is secured at such situs to seal off the opening of the nozzle ring and effect closure of the steam generator outlet conduit.

Until about the present time, the state of the art for installation of such a nozzle dam inside the confines of each half of a typical channel head, required the ingress of human operators through a relatively small aperture known as the manway for the placing, orientation, and securing of such a nozzle dam onto the nozzle ring. Since in a Westinghouse design there are usually four steam generators associated with a single reactor, and two nozzle rings in each channel head and, still further, since the secured nozzle dams must subsequently be unsecured from the nozzle rings and removed from the channel heads, there may be no less than 16 occurrences of a plurality of human operators entering and leaving an environment highly hostile to human life. Accordingly, although the main thrust of the instant invention relates to expediting the drain-down of such installations in the shortest possible time, another consideration to which the instant invention relates is the effecting of as complete an emptying of each and every inverted steam generator U-tube to ensure that none of same have a slug of water "hanging" therein such that such slug of highly radioactive water is accidentally discharged onto any of the human operators subsequently engaged in their maintenance business in the channel head, or for that matter, below or near the open manway of said channel head.

2. Description of the prior Art

As has been noted, supra, at least one prior-art investigator has taught and disclosed methods and/or means for increasing the efficiency of. and decreasing the drain-down time for nuclear steam generating systems. It is noted in the teachings of U.S. Pat. No. 4,649,019, Jawor, Mar. 10, 1987. that a principal feature of his invention requires that the nitrogen, which normally is the gas introduced in a manner so as to rise through the water in the divided channel head, effectively further rises or bubbles up into each of the inverted U-tubes thereby "releasing" the vacuum pocket formed at the top of each of such inverted U-tubes. In the practice of his invention he teaches the continuous introduction of such nitrogen and that same is maintained at a pressure of about 20 psi. Although unclear, it is assumed that this pressure should be expressed as 20 psig since he sees fit to utilize such designations or terminology throughout his teachings as it relates or refers to other portions of the steam generating system. In addition, if the designation is to psia instead of psig this would allow for only about a 5 psi differential between the system and ambient pressure, which would be rather difficult to judge or maintain. Furthermore, judging by the normal orifice size provided in situ by his most preferred embodiment, i.e., the high-impulse side of the flow transmitter, and the 16 cfm he reports to be injected therethrough, a pressure differential of about 20 psia rather than about 5 psia would appear to be correct. He also teaches that although theoretically the drain-down time of his system may be reduced to as little as 12 hours, it usually takes at least 16 hours.

The instant invention overcomes many of the difficulties inherent in operating the method of Jawor, supra, and according to the results of projected modeling, will result in a total drain-down time more closely approximating the theoretical considerations advanced, supra.

As quite correctly treated in Jawor's disclosures and teachings, the nitrogen introduced thereinto must be above atmospheric pressure in order for same to be injected into the system, and in the preferred embodiment such introduction of nitrogen is commenced at the beginning of the drain-down procedure. It will also be appreciated that as disclosed in his treatment of the prior art, once the drain-down level has reached the point generally defined as elevation E, the nitrogen introduced through the pressurizer will begin to disperse throughout the system via the reactor coolant water outlet conduits which are horizontally disposed at this same elevation, which conduits also serve as the primary water inlet conduits for each of the respective steam generators via the primary water inlet half of the channel head. At this point in the drain-down procedure, the water column, heretofore continuously maintained in the inverted U-tubes as well as in that divided channel head portion normally receiving the superheated primary water from the reactor and the intermittent leg, will be disrupted. It is at this point in Jawor's procedure wherein he concedes that the nitrogen from the pressurizer in "an expanded condition" ceases to be substantially effective, i.e., as to any water still trapped in the inverted vertical U-tubes, the nitrogen gas from the pressurizer, which is now flooding the bottom of the tubesheet, will not effectively rise thereinto and quickly or effectively release any of vacuum pockets which might still exist therein.

It has now been determined in the practice of the procedure outlined, supra, that the gauge pressure allowable for introduction of nitrogen into the system may, indeed, be rather critical. On one hand, it is important that same be maintained as high as possible to effect the advantages realized by ensuring that the gas is injected into the water column in a manner so as to ensure that the bubbles formed therein are not carried away by water flowing through the downwardly directed intermittent legs before such bubbles are allowed to rise to the bottom of the tubesheet, spread out across same, and rise within each of the several thousand tubes therewith juxtaposed. In addition, high inlet pressure for such nitrogen introduction will ensure sufficient gas in each of the inverted U-tubes for displacement of the volume of the water drained therefrom so as not to induce, or allow for formation of, a vacuum or partial vacuum therein. On the other hand, it has now been discovered that if too large a volume of nitrogen is so introduced, by virtue of such high inlet pressure, a gas-liquid interface is formed across the bottom of said tubesheet in a manner so as to disrupt the water column which was previously continuous above, through, and below this position of such now formed gas-liquid interface thereby interfering with the very objectives of Jawor's teachings. Jawor teaches, that when his drain-down has progressed to the point wherein the water level has reached an elevation common with the tops of the hot and the cold legs and represented generally at, or perhaps more concisely just above, E, the nitrogen which is introduced through the pressurizer enters and spreads horizontally throughout the system via such conduits, enters the respective channel heads, and allegedly begins to bubble upwardly into the tube bundles. Contrary to these teachings, my modeling of this configuration indicates that at this time the water level in at least that half of the channel head into which he introduces nitrogen has receded to the same, or substantially the same elevation E. Accordingly, the description, supra, that the nitrogen begins to bubble upward may not only be less than accurate, it may lead those skilled in this art away from the actual occurrence of events, and as will become more apparent from the description, infra, away from the teachings of the instant invention. For instance, it is herein suggested that as the drain-down procedure progresses through its initial stages, the nitrogen introduced according to the teachings of Jawor, supra, does bubble up through the water column then present in the channel head to the tube face and thence into the open bottom ends of the inverted U-tubes comprising the primary water side of the steam generators. However, once the level of the water in at least that divided portion of the channel head, in tracking the level in the rest of the system, is lowered below the bottom of the tubesheet, any resulting formed gas-liquid interface effectively and substantially blocks the further transfer of nitrogen bubbling up through the water still in the bulk of the channel head below such formed gas-liquid interface and any water still trapped in the tubes thereabove. It is at this point in the drain-down procedure of Jawor wherein a substantial loss of the effectiveness thereof occurs if, up to this time, the volume of nitrogen introduced thereby has not been perfectly balanced with the volume of water which has been drained from said inverted U-tubes. More importantly, it has now been discovered that given the operating parameters set forth and suggested by Jawor, such a balance of volume of nitrogen introduced into the divided channel head with the volume of water drained from said tubes does not and, indeed, cannot occur. Accordingly, it is precisely because of this inherent imbalance of volumes, or in another vernacular a ratio of volume of nitrogen introduced into the divided channel head to the volume of water removed from the inverted U-tubes thereabove of greater than 1:1, that the gist underlying the principal concept of the instant invention depends. It is noted that there are numerous references throughout these teachings wherein reference is made to volumes or volumetric quantities of gas, including nitrogen. For the sake of convenience to the reader, it is to be understood that comparisons therebetween, as for instance in expressed ratios thereof, are made at or under the same or equivalent conditions of temperature and pressure, unless otherwise indicated. With the above considerations in mind, it will now be appreciated that when such ratio, supra. exceeds 1:1, an excess of nitrogen will accumulate at the top of the water in the channel head and below the bottom of the tubesheet thereby forming the instantly discovered as well as the undesirable gas-liquid interface long before the water level in the system is lowered to the elevation of said tubesheet. As described above, when such an interface is formed, the water remaining in the tubes will effectively be trapped therein. Indeed, in the operation of several such nuclear-powered generating units, by employees of the assignee of the instant invention, it has been observed during such drain-down procedure that water entrapment can result in "gurgling" from the open ends of the U-tubes in such a system for several days and even upwards for almost a week after the initiation of drain-down.

With reference to the inherent imbalance of the volumes in and out of the channel head and U-tubes, respectively, it may be seen from the teachings of Jawor, supra, that his input of nitrogen at the rate of 16 cfm would completely fill the tube bundle in as little as about 45 minutes. Since the minimum time ascribed for the best attainable drain-down is about 16 hours, it will be appreciated that he teaches an input of nitrogen which exceeds any possible outflow of entrapped water by at least one order of magnitude. Accordingly, such prior-art teaching would inherently result in a ratio of volume of nitrogen introduced into the divided channel head to the volume of water removed from the inverted U-tubes thereabove of greater than about 20:1, which, of course, is way in excess of the maximum of 1:1 herein taught as being critical to the effecting of the instant invention and necessary for attaining the principal objects thereof.

SUMMARY OF THE INVENTION

The instant invention relates to a vastly improved system including methods, techniques, and means for removal of water and the attendant lowering of the level thereof in steam generating systems. In a typical nuclear-powered generating system of the pressurized water type, the Westinghouse design normally associates four steam generating units with a single nuclear reactor. During a planned or unplanned outage of such a generating system, it is oftentimes necessary to practice a drain-down procedure which involves, usually by gravity flow, draining the primary water from various sections of the reactor and the steam generators associated therewith, and also from various connecting conduits and ancillary equipment, it being understood that the water removed therefrom is normally introduced into one or several holding tanks until a later time when it is returned to the system.

It has now been determined, that in the instant and improved practice of certain disclosures of rather recently disclosed prior-art procedures, which procedures have been outlined, supra, both the gauge pressure utilized and the time of application of nitrogen into the system is, indeed, highly critical. It has also been discovered that it is important that the nitrogen gas pressure be maintained as high as possible to effect the advantages realized by ensuring that said gas is injected into the water column in a manner so as to ensure that the bubbles formed therein are allowed to rise to the bottom of the tubesheet. Such high inlet pressure for nitrogen introduction will also ensure sufficient gas in each of the inverted U-tubes for displacement of the volume of the water drained therefrom so as not to allow for formation of a vacuum or partial vacuum therein. It has, however, also been discovered that if too large a volume of nitrogen is so introduced by virtue of such high inlet pressure, a gas-liquid interface is formed across said tubesheet in a manner so as to disrupt the water column just above and below such interface thereby interfering with the very objectives of the instant invention.

According to the practice of the instant invention, the formation of such gas-liquid interface across the bottom of the tubesheet is substantially eliminated by the instant, new, and novel pulsed high-pressure injection (PHP) method and system. In the practice of the instant invention, the nitrogen is introduced into the system at any of the convenient points of entry already available in the reactor system, as pointed out in the Jawor disclosure, supra. However, in the practice of the instant invention, the inert gas is introduced at relatively high pressures and intermittently for only relatively short periods of time. In this manner of operation the advantages of high-pressure nitrogen introduction, supra, are realized and an interval of time is provided to allow the gas bubbles to rise and spread across the tubesheet and find their way into the open ends of each of the individual inverted U-tubes. In this new and improved technique the formation and/or maintenance of the unwanted and undesirable gas-liquid interface at, or near, the underside of the tubesheet is either completely eliminated or at least, substantially reduced. In other words, the system is allowed to rapidly hunt equilibrium before the next pulse of nitrogen is introduced. It will be appreciated that if the length of the water column through which the bubbles must rise, before reaching the underside of the tubesheet, is of any substantial length it is allowable to inject the next pulse of nitrogen before the bubbles resulting from the previous pulse have completely reached the desired equilibrium condition, since an increment of time is necessary for the each burst of bubbles to rise to the tube face, effectively spread across the bottom of the tubesheet, and enter the open ends of said tubes. It will also be seen that, for a given size nitrogen inlet orifice, there is an optimum relationship between the pressure of gas introduction and the ratio of pulse time-on to pulse time-off and, further, that there is a dependent and inversely proportional relationship between said pressure and said ratio of pulse time-on to pulse time-off to thereby effect an optimum ratio of volume of nitrogen introduced into the divided channel head to the volume of water removed from the inverted U-tubes thereabove of about 1:1. Even still further, it will be seen that the flow of gas, i.e., the ratio of pulse time-on to pulse time-off, is inversely proportional to either the square root of the ratio of different gas introduction pressures or simply such ratio, depending upon whether the gas introduction is under conditions of retarded or unretarded flow, respectively. As will be seen, infra, with the actual geometry provided by the equipment utilized by both Jawor. supra, and in the modeling of the instant invention, at a gas introduction pressure of 20 psig the required pulse time-on to pulse time-off ratio is about 0.0634:1, at 50 psig the ratio is about 0.0392:1, at a pressure of about 200 psig the ratio is 0.0192:1. and at about 400 psig the ratio is about 0.0135:1 for retarded flow conditions and 0.0634:1, 0.0245, 0.006, and 0.003 for unretarded flow conditions, respectively.

It is also suggested that in the practice of Jawor's method, the initial pressure setting for introduction of the nitrogen, in addition to being fairly critical, inherently may be rather difficult to achieve when it is realized that the feed line from the gas source includes a pressure spectrum ranging from 0 upwards to about 2500 psig. Accordingly, Jawor simply employs a fixed output pressure reducer in such line. On the other hand, in the practice of instant invention it is permissible to supply the nitrogen at several hundred psig in operative association with a pulsing device, which conveniently may comprise a timing device and solenoid valve and utilize, for the fine tuning of the instant system, an accurate pulsing on/off procedure. In this manner operator error, which would otherwise normally be associated with the setting of a variable valve either downstream of the nitrogen supply tank or of said fixed output pressure reducer, supra, to a predetermined, and now realized, critical setting, may be substantially reduced and the inherent reproducibility of a timing device employed. Another advantage of the instant invention may be realized if it can be demonstrated that, in the most preferred embodiment thereof, the pressure and/or volume of nitrogen introduction needs to be continuously adjusted as the length of the water column in each tube is reduced during the drain-down. Such continuous adjustment would be essentially unattainable in the continuous gas introduction and fixed pressure scheme of Jawor, supra, whereas it would be easily compensated for, accommodated, and automated in the instant PHP invention by operatively associating therewith a set of CPU driven instructions for continuously adjusting said ratio of pulse time-on to said pulse time-off. The rational or theory underlying the above concept relating to the desirability for continuously adjusting the ratio of the volume of nitrogen introduced into the channel head to the ratio of water drained from the tubes positioned thereover, as by continuously varying, in ever decreasing amounts, the ratio of pulse time-on to pulse time-off, will be better understood when it is realized that as the effective height of the water column of the entire system diminishes during such drain-down operation, so too does the potential energy of the downwardly directed vertical force vector effecting the removal of water through the system which is normally effected through a downwardly directed drain line attached to the horizontal extension of the channel head outlet conduit. Suffice it to say that the force vector, supra, is a function of the square root of the pressure differential represented by the difference in effective head pressure as such water in the system is lowered.

OBJECTS OF THE INVENTION

It is therefore the principal object of the present invention to develop a new system, method, and means for easily, quickly, accurately, and responsively relieving negative pressure developed in the upper portion of inverted U-tubes comprising the heat exchange means of steam generator units operatively associated with certain nuclear reactors.

Another object of the present invention is to develop a new system, method, and means for easily, quickly, accurately, and responsively relieving negative pressure developed in the upper portion of inverted U-tubes comprising the heat exchange means of steam generator units operatively associated with certain nuclear reactors, and more particularly to a technique for providing that operator error normally heretofore associated with such procedure is substantially eliminated or reduced.

A still further object of the present invention is to develop a new system, method, and means for easily, quickly, accurately, and responsively relieving negative pressure developed in the upper portion of inverted U-tubes comprising the heat exchange means of steam generator units operatively associated with certain nuclear reactors, and more particularly to an improved technique for providing that operator error normally heretofore associated with such procedure is substantially eliminated or reduced, and still more particularly providing that said improved technique is characterized by being inherently reproducible, relative to an incremental developed negative pressure and the relative relief thereof.

Still further and more general objects and advantages of the present invention will appear from the more detailed description set forth below, it being understood, however, that this more detailed description is given by way of illustration and explanation only, and not necessarily by way of limitation, since various changes therein may be made by those skilled in the art without departing from the true spirit and scope of the present invention.

BRIEF DESCRIPTION OF THE DRAWING

The present invention will be better understood from a consideration of the following description taken in connection with the accompanying drawing in which:

The FIGURE is a diagramatic and fragmentary illustration, to an enlarged scale, of only certain portions of a nuclear-powered steam generating system with the detailed cross-sectional view of the channel head taken along a line in a plane which is perpendicular to the vertical divider wall thereof.

DETAILED DESCRIPTION OF THE DRAWING

For the sake of clarity and a better understanding of the applicability of the illustration of the single drawing, a more detailed description of the same is given below.

Referring now more specifically to the single FIGURE, it will be appreciated that the illustration comprises a typical channel head generally illustrated at 101. It is well known to those skilled in this art that a typical channel head generally comprise a hemisphere in the orientation of the bottom half of a sphere and further, for example, that the type associated with the Westinghouse series 51 generator, is some 7 or 8 feet in diameter. The top horizontal boundary plane of channel head 101 is defined by tubesheet 102 which tubesheet 102 also defines the upper horizontal boundary of vertical divider wall 103, which vertical divider wall 103 is in a plane which extends from tubesheet 102 through the middle of said hemisphere and is continuously attached, usually by welding, to the inside peripheral surface of channel head 101 and, accordingly, is in the general form of a vertically orientated semicircle. It will therefore be further appreciated, that the cross-sectional view of the channel head in the FIGURE is taken along a line which is in a plane perpendicular to said vertical divider wall. The nozzle ring is generally illustrated a 104 and is affixed through the side wall of channel head 101 and defines aperture 105, the beginning, in this half portion of channel head 101, of steam generator outlet conduit 106, which outlet conduit is usually on the order of 32 inches in diameter. A channel head manway, not shown, defines another aperture in the side or bottom wall of this half of channel head 101 and is usually about 16 inches in diameter to provide for ingress and egress of equipment and operators to and from this half of channel head 101. Also shown, in highly simplified form for purposes of illustration, are fragments of the two opposite ends 107 and 108 of a single inverted U-tube which terminates at tubesheet 102 and discharges cooled primary water from end 107 into the primary water outlet portion of channel head 101 after having entered the other end 108 of said tube in superheated condition. As heated primary water $W_h$ from the reactor enters fragment tube end 108 of the partially illustrated inverted U-tube it passes upwardly into the steam generator section (not shown) and over the inverted U-configuration thereof (also not shown) for purposes of heat exchange and exits same through fragment tube end 107. It is understood, of course, that a typical tubesheet in such an installation contains on the order of some 3,000 vertical U-tubes in nested arrangement, with the beginning of each being at tubesheet 102 in that half of channel head 101 comprising the superheated primary water inlet portion thereof. Such heated primary water $W_h$ is fed from the nuclear reactor (not shown) through steam generator inlet conduit 110. The terminus of steam generator inlet conduit 110 defines inlet aperture 111, which in turn is defined by nozzle ring generally illustrated at 112 and which primary water inlet conduit 110 usually elbows to the horizontal rather than to the vertical as shown for channel head primary water outlet conduit 106.

It should be further appreciated that each half of channel head 101 oftentimes is essentially a mirror image of the other and is separated one from the other by means of vertical divider wall 103. As shown, that half of channel head 101 which communicates with generator primary water outlet conduit 106 for movement of primary water $W_c$, and is also sometimes referred to as the primary side water inlet side, is also in communication, by means of horizontal extension 113, of outlet conduit 106, with main circulation pump generally shown at 120, by which now relatively cooled primary water $W_c$ is pumped back via conduit 121 into the nuclear reactor (not shown) for reheating therein and thence for recirculation, via steam generator primary water inlet conduit 110 to the primary water inlet side of channel head 101, wherein said heated water again enters, at the tubesheet, the inlet aperture of each of the thousands of inverted U-tubes. Effecting the further removal of water through the chemical volume control system is normally effected through downwardly directed drain line 122 attached to horizontal extension 113 of primary water channel head outlet conduit 106. As noted in the simple illustration, supra, as such water travels up and over the inverted U configuration of each of several thousand such inverted U-tubes, it is in heat exchange relationship with the secondary water in the steam generator, which secondary water is on that side wall of each such tube which is opposite to the primary water side wall thereof, all of which is not shown. It will, of course be appreciated that the resulting cooled water in each such tube leaves the confines of its respective tube at that other end thereof which terminates at the tubesheet in that half of channel head 101 oftentimes referred to as the channel head primary water outlet side. Thus, the primary purpose of vertical divider wall 103 is to direct the flow of heated primary water into one end of each such inverted U-tube and after such primary water has lost substantial heat to the secondary water in the steam generator to thereby heat same for the production of steam to subsequently turn turbine(s), out from the other end of each such tube. The dictates of heat exchange considerations which result in this arrangement of a plethora of long, narrow, and inverted U-tube configurations are primarily responsible for the problem addressed by the instant invention, to wit, the need for the rapid and efficient removal of the water therefrom, albeit, the inherent propensity of forming vacuum pockets near or at the top of each of said inverted U-tubes, which pockets tend to prevent rapid and effective drainage of the water trapped thereunder. As shown, the gas to be introduced beneath the tubesheet, in this case, nitrogen, from source 130 is led via line 131 to any of several suitable means for effecting the required pulse time-on to pulse time-off ratio. As shown herein, such means is shown as pulser 132 from which the nitrogen may be led via line 133 to switch means 134 or around the operative portion of switch means 134 via line 137. In either event, the pulses of nitrogen are led to either high-impulse reference tube 136 via line 135, to low-impulse reference tube 139 via line 138, or both, or alternatively to other inlets (not shown) via other lines (not shown) including, if desired, introduction of a portion thereof into the missing image half of the channel head serviced by reactor primary coolant water conduit 110.

DESCRIPTION OF THE PREFERRED EMBODIMENT

A typical Westinghouse nuclear-powered steam generating system generally includes a reactor vessel serving each of four steam generating loops respectively. Reactor cooling water, i.e., primary water, which has been heated to approximately 550° F. within the reactor (@100% Rx power, Tave=578° F. and Tstm=525° F.), is circulated through each inverted U-tube bundle of each such steam generator. Each steam generator has a feed water inlet and a steam outlet at its top for introduction of secondary water, which is arranged in operative association therein with heat exchange means and said primary water.

The respective steam generators receive superheated primary coolant water from the reactor via reactor coolant water outlet conduits, which conduits also serve as the primary water inlet conduits of each of the respective steam generators. As will be appreciated, the superheated primary water enters the steam generator via the channel head at its lower end and passes upwardly through all of the U-tubes in the tube bundle, entering and leaving via the downwardly facing open ends of the tubes which are respectively attached and pass through a tubesheet. A vertical divider wall within the channel head ensures the flow of water into one end of each tube and out from the other. The steam generator inlet conduits are sometimes referred to as the "hot less" of the steam generation loops.

After the primary water heats the steam generator feed water which surrounds the tube bundle, thus generating steam, the now cooler primary water leaves the steam generator via downward movement in the tubes and thence the channel to the steam generator outlet conduit, which is also connected to the channel head. This water is subsequently conducted to the pump bowl or impeller casing of a centrifugal type main circulation pump, by which it is pumped back into the nuclear reactor. Thus, the steam generator outlet conduit may also be referred to as the inlet conduit to the pump. Such conduits are sometimes referred to as the "intermediate legs" of the steam generation loops, and the respective pump outlet conduits which also serve as the reactor inlet conduits, are sometimes referred to as the "cold legs" of the loops. The diameters of these respective conduits are relatively large, being generally on the order of about 32 inches.

For purposes of describing the present invention, it will also be understood that the nuclear-powered steam generation system includes a pressurizer for maintaining the pressure of the primary coolant water within the system usually well in excess of about 2000 psig, the lower end of the pressurizer tank being connected to the hot leg of one of the steam generation loops by a pressurizer line. The pressurizer is usually maintained about half-full of water, the remaining volume of the pressurizer tank being normally filled with saturated water vapor. Accordingly, for many nuclear reactor and steam generator configurations, the water level in said pressurizer is at an elevation below about the top of the inverted vertical U-tubes in the steam generators, but substantially above the elevation of the tubesheet therein. More specifically, in the particular system configuration described herein, the water level in the pressurizer is usually at an elevation about halfway between its vertical end points. However, it should be realized that the several thousand pounds per square inch of pressure exerted by the pressurizing nitrogen above the surface will tend to vertically depress the level in the pressurizer and raise the water level in other portions of the system. If the pressurizer were almost completely full of water, the resulting elevation therein of standing water would approximate the elevation of such inverted U-tube tops. For the normal drain-down procedure, the pressurizer tank has a nitrogen orifice at its top.

The common elevation of the hot legs of the steam generation loops is substantially the same as that of the respective cold legs. The intermediate legs include respective horizontally disposed portions at a common elevation, which is usually some several feet below the elevation just mentioned above, i.e., that of the hot and cold legs. The horizontally disposed portions extend from 90-degree elbow portions which redirect the downwardly flowing water within the downwardly directed leg portions from the generators.

The nuclear-powered steam generation system also includes a chemical volume control system by which chemical additives are introduced for various purposes. It is through this system that the draining down of the entire reactor primary coolant water is conventionally conducted. Water drawn from the system via the drain line and level control line ordinarily passes through heat exchangers, flow orifices, and a volume control tank before it is returned via a charging pump to the system which connects to the cold leg of the loop. The chemical volume control system serves the entire reactor coolant system.

Such a steam generation system further includes a residual heat removal system. The residual heat removal system is operated only when the main circulation pumps are shut down, and when the reactant coolant water is being drained down from within the system. The residual heat removal system draws water from a hot leg of one of the steam generation loops via a suitable line. The water is pumped by residual heat removal pump(s) through heat exchangers, after which the cooled water is returned to the system via the cold legs of all four loops, the returning water entering these legs via the respective return lines. A portion of the water being removed during a drain-down initially leaves the system via the residual heat removal system.

When the reactor coolant water is to be drained down to, or below, the elevation of the hot/cold legs, steam is discharged via the steam outlets from all of the steam generators and the respective loop circulating pumps are stopped. The residual heat removal pumps are started, and respective valves within the residual heat removal system are opened or closed, as the case may be, to divert the water taken from the hot legs into the chemical volume control system rather than to the return lines. Similarly, respective valves are either opened or closed, as the case may be, within the chemical volume control system to divert the water being taken from the system, as well as the water received from the system as aforesaid, to several holdup tanks, rather than to the volume control tank as would return the water to the system. Thus, all of the water draining from the system will be stored in the holdup tanks until it is to be returned to the system.

During this conventional drain-down the system is depressurized and the water draining from within the pressurizer is replaced by nitrogen gas entering the pressurizer via the gas line at the top thereof. The level of the draining water is constantly monitored during the drain-down procedure, at first by the water level indicator on the pressurizer until the water has been almost emptied therefrom, and thereafter using the low-level monitoring system.

For a still more detailed description of such a typical nuclear-powered steam generating system see, for instance, FIGs. 1 and 2 of '019, Jawor, supra, as well as the attendant teachings therein, the disclosures and teachings of which are hereby incorporated herein by means of reference thereto.

The instant invention discloses methods and/or means for increasing the efficiency of, and decreasing the time for effecting drain-down for nuclear-powered steam generating systems. It is noted, supra, in the teachings '019, Jawor, a principal feature of his improvement over the state of the art mandates that an inert gas such as, for example, nitrogen, is introduced in a manner so as to rise through the water in at least one of each half of a divided channel head, and allegedly effectively further rises or bubbles up into each of the open ends of the inverted U-tubes having a terminus in the plane of the tubesheet thereover to thereby release the vacuum pocket formed at the top of each of such inverted U-tubes. In this improvement over the practice of the prior art there is taught, and indeed emphasized, that the introduction of such nitrogen must be continuous and that to effect such an alleged improvement the nitrogen introduced thereinto must be above atmospheric pressure in order for same to be injected into the system. In the preferred embodiment of this art improvement, the introduction of nitrogen is commenced at the beginning of the drain-down procedure.

As has been noted, supra, in the practice of the unimproved and normal prior-art procedure heretofore practiced for effecting, without the introduction of nitrogen onto the bottom side of the tubesheet, drain-down of such systems once the water drain-down level has reached the point generally defined as elevation E in the FIGURE, the nitrogen introduced through the pressurizer will begin to disperse throughout the system via all the reactor coolant water outlet conduits which are horizontally disposed at this same elevation. At this point, the water column, heretofore continuously maintained in the inverted U-tubes as well as in that divided channel head portion normally receiving the superheated primary water from the reactor and the intermittent leg, will be disrupted. It should be kept in mind that as the water level in the rest of the system is lowered to the elevation of the bottom of the tubesheet and further as said level drops to about the level of the elevation designated as E, supra, the vertical lengths of the respective vacuum pockets in the tubes will elongate because the ambient atmospheric pressure operating on the open system can only effectively "support" a column head of about 32 feet of water. It is at this point in the unimproved and normal prior-art procedure heretofore practiced for effecting drain-down of such systems, that such improved prior-art procedure ceases to be substantially effective, i.e., as to any water still trapped in the vertical U-tubes, the nitrogen gas from the pressurizer, which is now entering the channel head through its primary water inlet conduit, will not effectively rise into the open ends of the tubes and quickly or effectively release all of the vacuum pockets which still exist therein, albeit, it eventually will so enter same over a substantially extended period of time during the familiar "gurgling" stage. This results (as fully explained, supra) because, as the nitrogen introduced from the pressurizer via the rather large diameter water inlet conduit enters the channel head it almost immediately effects the formation of the unwanted gas-liquid interface at the bottom side of the tubesheet.

In addition to the discovery relating to the shortcomings resulting and encountered in the common practice of the prior art, supra, it has now also been discovered, in the practice of alleged improvement thereover, as described in '019, supra, that it is well before the point that the water level in the system drains down to about the elevation of the tubesheet in the such supposedly improved procedure, that it ceases to be substantially effective, i.e., as to the efficient further release of any water still trapped in the vertical U-tubes. As noted, supra, the primary reason for this shortcoming in this described improvement over the common practice of the prior art is the inherent inability of the procedures and parameters set forth and prescribed therefore to maintain the now discovered requisite balance between the volume of nitrogen introduced thereby with the volume of water which has been drained from said inverted U-tubes or as otherwise herein defined, a ratio of the volume of nitrogen introduced into the divided channel head to the volume of water removed from the inverted U-tubes thereabove of about equal to, but not greater than about 1:1. As has been referenced, supra, this balance of volumes or the instant herein prescribed maintenance of such ratio is critical and goes to the very gist underlying the principal concept of the present invention.

In investigations leading to the development of the instant invention, it has now been determined, in the practice of the alleged improved procedure outlined in '019, supra, that the gauge pressure allowable for introduction of nitrogen thereinto the system is critical. On one hand, it is important that same be maintained as high as possible to effect the advantages realized by ensuring that the gas is indeed injected into the water column maintained in the channel head below the tubesheet. On the other hand, it has now been discovered that if too large a volume of nitrogen is so introduced, by virtue of such high inlet pressure, a gas-liquid interface is quickly formed across the bottom of said tubesheet in a manner so as to disrupt the water column which was previously continuous above, through, and below the position of such formed interface, thereby interfering with the transfer of the nitrogen into the open ends of the tubes located at about the horizontal plane defining the tubesheet. It is now postulated, that as the drain-down procedure of such alleged improved method or process progresses through its initial stages, the nitrogen introduced according to the teachings of Jawor, supra, does bubble up through the water column then present in the channel head to the tube face and thence into the open bottom ends of the inverted U-tubes comprising the primary water side of the steam generators. However, assuming in arguendo that there is a proper balance of the volume of nitrogen introduced into the U-tubes to the volume of water removed therefrom once the level of the water in each such divided channel head, in tracking the level in the rest of the system, is lowered below the bottom of the tubesheet, the resulting formed gas-liquid interface effectively and substantially blocks the further transfer of nitrogen bubbling up through the water still in the bulk of the channel head below such formed gas-liquid interface and any water still trapped in the tubes thereabove. It has now been discovered that it is long before this point in the drain-down procedure of this alleged improvement, wherein a substantial loss of the effectiveness thereof occurs since the operating parameters set forth and suggested therein do not provide for maintaining a balance between the volume of nitrogen introduced into the divided channel and the volume of water drained from said tubes. With the above explanations in mind, it will be appreciated that when such ratio supra exceeds 1:1, an excess of nitrogen accumulates over the water at the top of the channel head and below the bottom of the tubesheet thereby forming the unwanted and undesirable gas-liquid interface long before the water level in the system is lowered to the elevation of said tubesheet.

EXAMPLES

In order that those skilled in the art may better understand how the present invention can be practiced, the following examples are given by way of illustration only, and are not intended for the purposes of indicating limitations and/or restrictions on the breadth and/or scope encompassed by the various embodiments of said invention, including, but not necessarily limited to, the embodiments illustrated herein since certain practicalities have been limiting factors for purposes of this presentation.

In the presentation of these examples, it should be noted that the first thereof, i.e., Example I, infra, represents only a report of the earliest approach to solving the objectives of the instant invention and is to be viewed only for its discussions relating to the relative relationship of operation thereof at different nitrogen inlet gas pressures. In this sense, Example I, infra, may be viewed somewhat in the sense of a negative example. This will be better understood after it and the information contained in Example II, infra, is compared.

EXAMPLE I

This example was predicated upon the preposition that all of the water draining down to the chemical volume control system represented water removed only from the inverted U-tubes and not from the rest of the system. Although this preposition is later corrected in Example II, infra, to more nearly represent the actual occurrence of physical events during drain-down, the conclusions herein may be of some use to the reader in both understanding the mathematical relationship for operation at different nitrogen inlet pressures for introduction thereof onto the underside of the tubesheet and to illustrate that even with this approach, which gives more benefit of the doubt to the teachings of Jawor, supra, such prior-art practice is not the most desirable to be followed.

Using the factors set out in the description of '019, supra, an initial water drain-down rate of 50 gallons per minute from the channel head operatively associated with the steam generator primary water outlet side represents about 6.685 cubic feet per minute of water removed through the chemical volume control system. At the pressure setting of 20 psig, it is reported that the delivery rate of nitrogen from the high pressure bottle source to the bottom of the channel head and thence to the underside of the tubesheet is on the order of about 16 cubic feet per minute. On the assumption that the water so removed represents only a volume which initially drains from the upper portion of the U-tubes and therefore only further represents the volume of void that must be accounted for in order to not create pockets of negative pressure, there exists an imbalance between the volume of gas in, to the volume of water out, of some 9.315 cubic feet per minute of operation. Accordingly, at a delivery pressure of 20 psig and for the physical arrangement herein described, only about 42 percent of the nitrogen delivered is required to fill such void. This reduced delivery volume or rate may easily be accommodated by delivering the nitrogen at this pressure for only about 42 percent of a pulsed-on pulsed-off cycle or for 6.685 time units on and 9.315 time units off from which a pulse time-on to pulse time-off ratio of about 0.72:1 is derived. It will be understood that, for deriving such ratios for operation at other nitrogen delivery pressures, the ratio of nitrogen delivered is proportional to the square root of the ratio of such delivery pressures assuming retarded flow conditions. Thusly, at 50 psig the nitrogen needs to be delivered for about 26 percent of the cycle or, at a pulse time-on to pulse time-off ratio of about 0.36:1. For nitrogen delivery pressures of 200 psig and 400 psig, the respective delivery portion of the cycle drops to about 13 percent and about 9 percent, with the respective pulse time-on to pulse time-off ratios dropping to about 0.15:1 and 0.10:1.

EXAMPLE II

In this example, the parameters utilized therein are much more closely matched to the occurrence of physical events occurring during drain-down. For instance, the information gathered herein is based upon the proposition that the water draining from the inverted U-tubes represents only a small portion of the total water in the system. In the type of system referenced herein. i.e., a Westinghouse series 51, each of the four sets of tube bundles have a volumetric displacement of about 700 cubic feet for a total of about 2700 or 2800 cubic feet or about 3 percent of the displacement of that portion of the system initially filled with primary water and subsequently drained—assuming a total drain-down and including the volume of the residual heat removal system and the chemical volume control system, but not including the volume of the primary water holding tanks.

In the instance of the physical setup described and taught in the disclosure of the prior-art teachings of '019, supra, and wherein at an inlet pressure of 20 psig the orifice provides a volume of 16 cfm of nitrogen, it has now been determined that the flow rate of nitrogen into each channel head is about 20 times too great (actually 21.3 times to great). For instance, the approximate volume of a typical steam generator tube bundle is about 700 cubic feet. This includes some 350 cubic feet represented by those tubes in that half over that divided portion of the respective channel head being filled directly with the nitrogen bubbling up through the water column in that divided channel head, and the other 350 cubic feet representing the volume defined within the tube legs on the other side of the top of the inverted U configuration which must also be filled with nitrogen to completely release any vacuum which would otherwise be formed therein. Alternatively, in figuring these parameters another way it may be seen that the excess flow rate may be closer to being about 19 times too great if it assumed that about 12 hours of total drain-down time of the 16 hours reported to be achievable, is attributable to that portion of the change of elevation represented by the horizontal distance between the top and the bottom of the tubes, i.e., the top of the inverted U portion and the junction with the tube face. In any event, for purposes of effecting the instant invention, it has been determined that this approach for evaluation of the ratio of excess of nitrogen as being about 20 times too great is a sufficiently close approximation because of a number of factors, including unaccounted for losses of gas in the divided channel head and/or the water stream draining from and through the chemical volume control system.

The above determinations are arrived at by means of the following considerations:

At 200 psig and with the line and orifice restrictions used in the Jawor setup, supra, 16 cfm of nitrogen enters the primary water outlet leg reactor water inlet leg, bubbles up through the channel head and collects in the underside of the tubesheet. From there it presumably bubbles up into the 3000-odd tubes thereover. It may easily be seen that in just about 45 minutes enough nitrogen has been so introduced to completely fill all of said tubes, i.e., 16 cfm×42.94 min.=687 ft.$^3$, i.e., the given volume of a typical tube bundle. Introduction at this rate and under these conditions is roughly about 20 times too great a rate if the total drain-down time is either 16 hours (16/(42.94/60)=22.36) or 12 hours (12/(42.94/60)=16.77). Accordingly, for a total drain-down time of 16 hours, at least 12 hours of which represents time during which the overall water level in the system, outside the U-tubes, is above the elevation of the tube sheet, the nitrogen introduction rate needs to be cut by a factor of about 17 or, for each hour of drain-down, the pulse time-on for nitrogen introduction needs to be about 3.58 minutes, the pulse time-off, i.e., when no nitrogen is introduced needs to be about 56.42 minutes. If the ratio of pulse time-on to pulse time-off is maintained at about 0.066 during such a drain-down, the otherwise steady state of nitrogen introduction of 16 cfm, will by means of the instant periodic introduction be effectively reduced to about 0.954 (0.95) cfm. Thusly, by means of using a pulse time-on to pulse time-off sequence of nitrogen introduction, which nitrogen pressure is sufficient to deliver 16 cfm and which ratio of time-on to time-off is 0.0634, an amount of nitrogen will be delivered which at continuous steady state is equivalent to said 0.954 cfm. Over a 12-hour period this represents about 687 cfm (0.954 cfm×60×12).

Using the same set of parameters for the equipment setup and changing only the pressure of nitrogen introduction into said primary water steam generator outlet leg the resulting ratio of pulse time-on ($t_1$) to pulse time-off ($t_2$) for an increase in such introduction pressure will, of course, require a reduction of such ratio. For purposes of these discussions, the flow of the working fluid, herein nitrogen gas, to the nozzle or orifice from which it bubbles into the primary reactor coolant water is regarded and treated as retarded flow rather than unretarded flow, which is discussed later in this example, and further treated as if no loss or gain of heat, no friction, and no internal work is done. Accordingly, the rate of the weight of nitrogen (G) through such orifice may be expressed as:

$$G = (1.06a/\sqrt{T_1})(p_2(p_1-p_2))^{\frac{1}{2}}$$

where for purposes of these considerations the area (a) and the absolute temperature ($T_1$ are constants. Since the final absolute pressure which is influenced by the water pressure inside the generator primary water outlet conduit is essentially constant at the inception of drain-down, the amounts of nitrogen delivered to the underside of the tubesheet at different inlet gas pressures is a function of the one-half power of the differences therein. Such ratios are therefore essentially dependent and inversely proportional to the square root of said pressures and can be calculated as follows, letting $t_1$ represent the pulse time-on per unit of time, i.e., 3.58 min/hr, and $t_2$ equals the pulse time-off per unit of time.

For a nitrogen delivery pressure of $p_1$ (20 psig) it has been empirically determined that the nitrogen delivery rate is equal to 16 cfm. Accordingly, for that portion of the total drain-down representing a reduction of the water level in the tubes (12 hr) to effect the total volume therein of 687 ft.$^3$, the pulse time-on, (min/hr) is equal to $t_1$, and $$t_1 = 687/(16 \times 12) = 3.58 \text{ min/hr};$$

$$t_2 = 1 - t_1 = 60 - 3.58 = 56.42 \text{ min/hr};$$

$$t_1 : t_2 = 3.68/5642 = 0.0634.$$

At a higher nitrogen inlet pressure, $p_2$, the period of pulse time-on must be reduced to compensate for the increased nitrogen delivery rate. As noted, supra, the relationship is inversely proportionate to the square root of the respective pressurizer. Therefore, a new ratio of $t_1':t_2'$ may be determined as follows:

$$t_1/t_1' = \sqrt{p_2}/\sqrt{p_1}, \text{ or}$$

$$t_1' = t_1(\sqrt{p_1}/\sqrt{p_2})$$

Since $t_1$ and $p_1$ have already been determined, i.e., $t_1 = 3.58$ and $p_1 = 20$ *psig*.

new ratios can be easily determined. For instance:
@50 psig $t_1' = 2.264$ min/hr and $t_1':t_2' = 0.0392$
@200 psig $t_1' = 1.132$ min/hr and $t_1':t_2' = 0.0192$
@400 psig $t_1' = 0.80$ min/hr and $t_1':t_2' = 0.0135$ The most effective use of the above pulse time on to pulse time-off ratios will be realized by arranging the period intervals in units considerably smaller than min/hr such as, for example, sec/min or better yet fractions of a second per fractions of a minute.

It will be appreciated that the assumptions and calculations based thereon to this point in this example are predicated on a flow of nitrogen through the inlet tube to the water column inside the channel head being retarded. That is to say, the nitrogen inlet pressure is not sufficiently great enough to balance the back pressure exerted thereupon by the force exerted by such water column, including the water standing in said inverted vertical U-tubes at or about the inception of draindown. More precisely, the critical pressure, i.e., that above which fluid flow through an orifice becomes retarded, for a diatomic gas (such as nitrogen) may be expressed as $p_t = 0.53 p_1$ where $p_t$ represents said critical pressure and $p_1$ represents the nitrogen inlet gas pressure. If the exerted back pressure $p_3$ is greater than $p_t$ the flow is considered retarded. Now considering that, in the type of nuclear generating plant herein considered, the water column, supra, does not exceed about 32 feet once the system is opened, i.e., the system is depressurized, the nitrogen inlet line to the top of the pressurizer is opened, and the valves to at least the chemical volume control system are opened, it will be appreciated that with essentially a back pressure of 15 psig ($p_3$) the inlet pressure from the nitrogen source must be at least about 28 psig (15/0.53) to ensure unretarded flow. In addition, with other geometric configurations in play, as for instance the spent fuel pit being at an elevation in excess of 50 feet above the reactor water elevation, the calculations, supra, for retarded flow conditions may be valid for nitrogen gas inlet pressures perhaps above about 50 psig. It should now be clear to those skilled in this art that the transfer of such nitrogen to beneath the tubesheet may be treated as retarded fluid flow at or near the recommendations of Jawor, supra, and as unretarded fluid flow thereabove, i.e., once an inlet pressure is utilized above the effective critical pressure, supra.

EXAMPLE III

As noted in Example II, supra, a substantial portion of the nitrogen inlet pressure spectrum taught herein and the attendant calculations for respective pulse time-on to pulse time-off ratios at various elevated inlet pressures, need to be based on considerations of unretarded flow, rather than for retarded flow. Indeed, depending on the actual pressure used or calculated, both methods are needed; retarded flow for below effective critical pressures based on the geometric parameters of the nuclear system, and unretarded flow for inlet pressures thereabove. Thusly, for 20 psig the $t_1(3.58):t_2(56.42)$ of 0.0634 still is valid, but at inlet pressures above about 30 psig the relationship of pressures is simply inversely proportional (see Fliegner's equations) rather than a function of the square roots thereof. Accordingly, and depending on the exerted back pressure of the system some of the values at various elevated nitrogen gas inlet pressures for the introduction thereof to beneath the tubesheet illustrated in Example II, supra, may need to be considered as well as some of those listed below. As noted in more detail in the section entitled invention parameters, infra, there may be instances wherein portions of both sets of tabulated data, i.e. those illustrated in Example II, supra, and those illustrated below may be partially utilized in the performance of two-step calculations.

| Inlet Nitrogen Pressure, psig | $t_1:t_2$* ratio |
|---|---|
| 20 | 3.58:56.42 = 0.0634 |
| 50 | 1.43:58.57 = 0.0245 |
| 100 | 0.72:59.28 = 0.0121 |
| 200 | 0.36:59.64 = 0.0060 |
| 400 | 0.18:59.82 = 0.003 |

*Expressed as $t_1:t_2$ for pressures above the starting parameters of about 20 psig.

INVENTION PARAMETERS

After sifting and winnowing through the information, supra, as well as data from other results and operations of the instant, new, novel, and improved technique, including methods and means for the effecting thereof, the operating variables, including the acceptable and preferred conditions for carrying out my invention are summarized below.

The principal parameter that must be kept in mind in predetermining or otherwise arriving at acceptable operating conditions for attaining the objects of the instant invention is the maintenance of a near perfect balance between the volume of nitrogen introduced into the respective channel head partition and the effective total volume defined by the legs of the inverted U-tubes located thereabove the tubesheet. To put it another way, the ratio of the volume of nitrogen introduced into the primary water outlet side of a divided channel head to the volume of water removed from the inverted U-tubes directly thereabove, including the other half of the tubes over the channel head primary water inlet side should be maintained at about, but not greater than 1:1. This prescription presupposes that the initiation of introduction of the nitrogen into the bottom of the divided channel head is at about the same time as when the level of the water in the system crosses below about the elevation of the uppermost boundary of the inverted U-tubes in the steam generator. If it is desired to delay the introduction of the nitrogen until a later time, but before the water level in the system is lowered to the elevation of the tubesheet, the rate of introduction of the nitrogen will have to be increased such that such ratio is greater than about 1:1 at least until the level of the water in the tubes falls sufficiently to catch up and match that in the rest of the system. This can be quite easily accomplished by adjusting the ratio of pulse time-on to pulse time-off upwardly and, after the water levels inside and outside the tubes are matched, readjusting the ratio back to its optimum amount. However, such practice is strongly advised against. This admonition is offered, if for no other reason, because of the recognition that at the increased rate of introduction of nitrogen into the channel head during the "catch up" phase, there is a strong likelihood that the undesired and unwanted gas-liquid interface may inadvertantly be formed below the respective tubesheet, thereby providing the disruption of the water column bridging the channel head and the U-tubes, which disruption formation is opposite to the principal operation and objects of the instant invention. However, as discussed in greater detail, infra, even with such disruption formation contingency a possibility, there may be instances wherein it is felt to be a necessary approach due principally to the elevational mismatch designed into many such systems by the arrangement of the tops of the inverted U-tubes and the uppermost portions of the steam generating units. Fortunately, as also discussed in greater detail, infra, the slight, but ever increasing imbalance in the ratio between nitrogen gas in to tube water out, due to the ever lessening effect of the decreasing head of water in the system as drain-down proceeds, oftentimes substantially compensates for such designed elevational mismatch. Furthermore, with the great deal of flexibility built into the technique comprising the instant invention, suitable adjustments can be built into the operating gas introduction technique or method.

It will be appreciated by those skilled in this art that the considerations, both supra and infra, are predicated upon a number of assumptions and approximations. For instance, although the rate of water removal from the generator channel head outlet side can initially be determined as the level of water in the system is lowered, it is recognized that the respective effective head pressure on the outlet or discharge orifice from such chemical volume control system will be diminished, thereby effecting a lowering of the water removal rate through same. Accordingly, if the ratio of inlet gas volume to water outlet from the channel head was exactly balanced at the very inception of drain-down, then, as the effective head pressure on the system diminishes. Such ratio will become unbalanced in the direction of becoming too great. i.e., gradually rising above an optimum of unity. One alternate embodiment of the instant invention which has been devised and suggested, supra, to compensate for this contingency, is to continuously adjust the rate of flow of nitrogen into the bottom of the channel head. As noted at the outset of discussions of some of the deficiencies of the prior art remedies advanced for overcoming the heretofore substantially slow removal of water trapped in the closed and inverted U-tubes of the steam generators, it is, for all intents and purposes, physically impossible for a human operator to finely tune and continuously adjust the valve or other control device to provide for such adjustment. On the other hand, with the suggested operative association of suitable means for adjusting the ratio of pulse time-on to pulse time-off for such nitrogen gas introduction, such continuous adjustment can easily and accurately be effected in the practice of the instant invention.

Another factor which has been somewhat simplified in arriving at the expressed operatives for carrying out the practice of the instant invention, relates to the relative elevations of the water in the pressurizer and in the plethora of inverted U-tubes before the initiation of a typical drain-down operation. If the water level in the pressurizer is assumed to represent essentially the maximum level in the generating system and such elevation happens to coincide with about the uppermost portion of the inverted U-tubes, i.e., the highest portion of the U-portion, then as the level in the total system recedes and the balance, between the nitrogen introduced to the channel head/U-tubes and the water removed therefrom, remains at about unity, substantially all of such water in such tubes will be drained therefrom just at about the time that the water level in such total system is lowered to about the elevation of the bottom of the tubesheet. Since, in most instances, the pressurizer is only about half full of water while such a generating system is operating, and further, since the vertical height of a typical pressurizer is generally not greater than the uppermost portion of a typical steam generator operatively associated therewith at the inception of drain-down, the water level in the U-tubes is somewhat higher than is the water level in the pressurizer. As noted previously, the several thousand pounds per square inch exerted by the pressurizing gas in the upper portion of the pressurizer may act to depress the level of the water therein and effectively raise the water level in other portions of the system during its operation. However, upon preparation for a drain-down procedure the venting of the valve at the top of the pressurizer effectively removes this downwardly directed force vector and may allow the level in the pressurizer to seek a position above about the midpoint thereof with attendant reductions in other portions of the system, i.e., the system will hunt a horizontal equilibrium. Accordingly, in most such instances, there may be a need for the ratio of gas in to water out of the U-tubes to be greater than about unity. It is therefore postulated that, if no adjustment is made to such ratio, the deficiency thereof at the beginning of drain-down may just about be balanced by the excess thereof which is anticipated, supra, to occur near the stage therein about when the water level in the system reaches the elevation of the tubesheet. To view this situation in another perspective, the significance of the initial elevation of the water in the system, whether it be at about the vertical midpoint of the pressurizer or at a higher elevation, is not as critical a factor as is ensuring, that for each channel head, the average volumetric flow rate of nitrogen into the bottom of the inverted U-tubes multiplied by the time it takes for the system water level to drop from its initial elevation, after said system is opened to the atmosphere until the water level drops to about the elevation of the tubesheets, is equal to the total volumetric displacement of the inverted U-tube bundle.

Whether the ratio of about unity for the volume of gas. Such as nitrogen, which is delivered to the bottom of the tubesheet to the volume of water which is removed from the U-tubes thereabove is used for effecting the practice of the instant invention, or, for a given nitrogen delivery pressure, either the percent of a pulsed-on/pulsed-off cycle, or the ratio of pulse time on to pulse time off is utilized for predetermining the gas introduction, it should be realized that some degree of latitude or variance from the empirically determined or calculated values is contemplated in the teachings and disclosure herein described. Accordingly, the most preferred ratio of about unity for volume in/out can be broadened to a ratio ranging between about 1.2:1 to about 0.8:1 without unduly departing from these teachings. That is to state that it appears that the optimum conditions herein taught can be varied by perhaps at least 10 percent without inducing any practical error or problems into the practice of the instant invention, and most probably same can be varied by as much as 20 percent without substantially adversely affecting such practice. Indeed, if necessary for meeting other considerations, such ratio may be broadened even further for portions of the period of the drain-down procedure if to otherwise adjust or compensate for other design criteria such as referenced, supra, i.e., differences in elevation of the water level in the pressurizer and the tops of the U-tubes. Likewise, the other ratios herein taught to be critical to the practice of these teachings may be treated with the same or similar degrees of latitude.

If a different size, but still rounded in cross-section, orifice is exchanged for the aperture herein utilized for arriving at the above figures. calculations reflecting adiabatic conditions can be approximated using Fliegner's formula on the assumption that the pressure in the nitrogen tank will be at least twice that in the line inletting to the conduit below the channel head. This approximation should be more accurate when the preferred higher guage pressures, taught herein as being the more preferred embodiment, are utilized, and thereby results in essentially a relationship which is proportional to the area of the aperture, i.e., the rounded orifice, and which may be expressed in terms of any convenient measure such as square inches. Of course, if other changes are made in the physical setup of the system other adjustments will have to be accounted for. It is therefore suggested that in the effecting of practice of the instant invention, the delivery rate to the bottom of the tubesheet, be it by means of the flow transmitter high-impulse reference tube or by other means, be first determined empirically and preferably at or near the nitrogen delivery pressure at which it is anticipated that the drain-down procedure will most likely be operated, it being further understood that this nitrogen delivery pressure should not be confused with any numerical value attributable to the pressure of the nitrogen which is maintained in the pressurizer during the normal operation of the nuclear-powered steam generated, propulsion or electric utility system.

From the calculations and other considerations advanced, supra, particularly those given in Example 11, it is abundantly clear that the parameters given in the physical setup of Jawor, which is not at all unlike that used in the development of portions of the instant invention, that about 20 times too much gas is introduced therein. The balance between the amount of gas in, to the amount of water out, of said inverted vertical U-tubes can be attained by utilizing a pulse time-on to pulse time-off ratio of about 0.06 or more specifically 0.0634. If higher inlet pressures are to be used, as indeed is herein strongly suggested, the new ratios of pulse time-on to pulse time-off are easily determined by letting $t_1:t_2$ equal the ratio empirically determined with a first given pressure $p_1$ at a first determined gas delivery rate. The new ratios, i.e., $t_1':t_2'$ are then determined for either retarded flow by $t_1(\sqrt{p_1}/\sqrt{p_2})$ or $t_1'=t_1(p_1/p_2)$ for unretarded flow, and where $t_2'=(1-t_1')$. Thusly, for the above given parameters and physical setup, the optimum the Table, below.

| Effect of Gas Inlet Pressure on Ratios of Pulse Time-on to Pulse Time-off | |
|---|---|
| Nitrogen Delivery Pressure (psig) | Ratio $(t_1:t_2)$* |
| For Retarded Flow** | |
| 20 | 0.0634 |
| 50 | 0.0392 |
| 200 | 0.0192 |
| 400 | 0.0135 |
| For Unretarded Flow** | |
| 20 | 0.0634 |
| 50 | 0.0245 |
| 100 | 0.0121 |
| 200 | 0.0060 |

| -continued | |
|---|---|
| Effect of Gas Inlet Pressure on Ratios of Pulse Time-on to Pulse Time-off | |
| Nitrogen Delivery Pressure (psig) | Ratio $(t_1:t_2)$* |
| 400 | 0.003 |

*Expressed as $t_1":t_2"$ for pressures above the initial pressure used for the first empirical determination of nitrogen delivery rate.
**Fliegner's empirical formulas for retarded and unretarded flow are used depending on critical pressure considerations ($p_t$). If the back pressure ($p_3$) exerted by the standing water column in the channel head and U-tubes is effectively less than $p_1$, then flow of nitrogen through the orifice remains constant, i.e., unretarded flow. Assumptions include that n equals 1.40 in the equation below:
$p_t = p_1(2/(n + 1))^{n/(n - 1)}$ pounds/inch$^2$ where $p_1$ is the nitrogen inlet pressure and accordingly $p_t = 0.53p_1$ pounds/inch$^2$.

For the physical setup of the nuclear reactor/steam generators system described herein, it will be appreciated that a single one-step calculation will oftentimes suffice and may be based on the unretarded flow considerations, supra, if the first pressure empirical determination is made in the neighborhood of 20 psi and the desired pressure for actual operation is substantially thereabove, i.e., ranging upwards to the range of about 200 to about 400 psi. This appears to be a viable alternative if the back pressure in the system is in the neighborhood of about 1 atmosphere and, accordingly, the inlet nitrogen pressure needs to be only in excess of about 28 psig to ensure unretarded flow, see Example II, supra. It will be appreciated, however, that in instances wherein the first pressure empirical determination is substantially lower than 20 psig and/or the geometric configuration of the system is substantially different from that discussed, supra, so as to effect a much higher back pressure, such a simple one-step calculation may not be close enough of an approximation. Accordingly, it is suggested that for such instances the calculations be performed in two steps vis-e,gra/a/ -vis utilizing the necessary mathamatics for determining a $t_1:t_2$ (intermediate) ratio under conditions for retarded flow between the first determination empirical flow rate and intermediate $p_2$ representing a nitrogen introduction pressure where the flow chacteristics in the system change over from retarded to unretarded and thereafter utilizing such intermediate $t_2'$ and $p_2$ as a starting point of a new $t_1$ and $p_1$ whereafter a second calculation is made for conditions of unretarded flow.

As noted, supra, and claimed below, these ratios for any given set of parameters may be adjusted to allow for a variance of about 10 to about 20 percent. Accordingly, for the nitrogen delivery pressure of 20 psig the optimum $t_1:t_2$ ratio of 0.0634 could be expanded to about 0.07:1 to about 0.057 or more so to about 0.075 to about 0.05. Of course, for other pressures, orifice opening, etc., similar latitude may be appropriate.

From the above descriptions and teachings it will be apparent to all those skilled in this art that there has been described methods, means, and a system for intermittently introducing, in predetermined quantities and at pressures within prescribed ranges, an inert gas such as, for example, nitrogen into a nuclear-powered steam generating system during the drain-down thereof, and further that such methods, means, and system achieves all of the objects of the instant invention. While I have shown and described particular embodiments of my invention, modifications and variations thereof will undoubtedly occur to those so skilled in this art. I wish it to be understood therefore that the appended claims are intended to cover such modifications and variations

What I claim as new and desire to secure by Letters patent of the Unites States is:

1. An improved method of draining down contained reactor-coolant water from the inverted vertical U-tubes of at least one vertical-type steam generator in which the upper inverted U-shaped ends of said tubes are closed and the lower ends thereof are open, said steam generator having a channel head at its lower end including a vertical dividing wall defining a primary water inlet side and a primary water outlet side of the generator, said steam generator having chemical volume control system means and residual heat removal system means, and said steam generator being part of a nuclear-powered steam generating system wherein said reactor-coolant water is normally circulated from and back into the reactor via a loop comprising said steam generator and inlet and outlet conduits connected to the lower end of said steam generator, and said reactor being in communication with pressurizer means and comprising the steps of introducing a gas which is inert to the system and which is under pressure above atmospheric pressure into at least one of the downwardly facing open ends of each of said U-tubes from below the tubesheet in which the open ends of said U-tubes are mounted adjacent the lower end of said steam generator while permitting said water to flow out from said open ends of the U-tubes, the improvement in combination therewith for substantially increasing the effectiveness and efficiency of such water removal from said tubes, which improved method comprises the additional steps of:

(A) determining the parameters effecting a first average volumetric rate of removal for a predetermined period of time, said period of time being substantially coincident with the period of time in step (B), infra, of the reactor-coolant water from said inverted vertical U-tubes, the specific unit for said first average volumetric rate expressing properties identical with the properties expressed in a second average volumetric rate maintained in a later mentioned step;

(B) determining the parameters effecting a second average volumetric rate of introduction of said gas, which is under said pressure above atmospheric pressure and which is introduced into at least one of the downwardly facing open ends of each of said U-tubes, at a predetermined value and at least for a portion of the period of time during said draining down in which the reactor-coolant water level, in the portion of the reactor cooling system external to said tubes and including said pressurizer means, is lowered to about the elevation of said tubesheet, said at least one of the downwardly facing open ends of each of said U-tubes being in communion with said primary water outlet side in the channel head of said steam generator and effecting a standing water column therein; and (C) maintaining a ratio of said second average volumetric rate of introduction of said gas to said first average volumetric rate of removal of the reactor-coolant water from said inverted vertical U-tubes in the range from about 1.2:1 to about 0.8:1;

said improved method characterized by the fact that the maintenance of said ratio effectively eliminates the formation of a gas-liquid interface juxtaposed the underside of said tubesheet, which gas-liquid interface formation would otherwise substantially impede or otherwise prevent the efficient and effective introduction of said gas into at least one of the downwardly facing open ends of each of said U-tubes.

2. The method according to claim 1, wherein said gas is nitrogen.

3. The method according to claim 2, wherein said ratio of said second average volumetric rate of introduction of said gas to said first average volumetric rate of removal of the reactor-coolant water is maintained in the range of from about 1.1:1 to about 0.9:1.

4. The method according to claim 3, wherein said ratio is maintained at about 1:1.

5. The method of claim 1 wherein said introduction of said gas is intermittently and repetitively performed at periodic intervals.

6. The method of claim 3 wherein said introduction of said gas is intermittently and repetitively performed at periodic intervals.

7. The method of claim 4 wherein said introduction of said gas is intermittently and repetitively performed at periodic intervals.

8. The method according to claim 1, wherein said ratio is maintained by the introduction of said gas into at least one of the downwardly facing open ends of each of said U-tubes wherein said introduction of said gas is intermittently and repetitively performed at periodic intervals at a ratio of as introduction pulse time-on to gas introduction pulse time-off of about $t_1':t_2'$, and wherein:

$t_1$ = the pulse time-on period derived from empirical determinations of the delivery rate at a first preselected gas introduction pressure, to beneath said tubesheet, of $p_1$;

$t_1' = (\sqrt{p_1}/\sqrt{p_2})t_1$ wherein $p_3$ is a second preselected pressure of gas introduction which is in excess of $p_1$, but is less than the critical pressure ($p_t$) of said gas;

$p_t \approx 0.53 p_1$ and $p_t$ is less than $p_3$, wherein $p_3$ equals the back pressure exerted by said standing water column in said channel head and said U-tubes in communion therewith; and $t_2' = (1-t')$ and represents the pulse time-off period, with $t_1'$ representing the pulse time-on period.

9. The method according to claim 1, wherein said ratio is maintained by the introduction of said gas into at least one of the downwardly facing open ends of each of said U-tubes wherein said introduction of said gas is intermittently and repetitively performed at periodic intervals at a ratio of gas introduction pulse time-on to gas introduction pulse time-off of about $t_1':t_2'$, and wherein:

$t_1$ = the pulse time-on period derived from empirical determinations of the delivery rate at a first preselected gas introduction pressure to beneath said tubesheet of $p_1$;

$t_1' = (4.472/\sqrt{p_2})t_1$ wherein $p_2$ is a second preselected pressure of gas introduction which is in excess of $p_1$, but is less than the critical pressure ($p_t$) of said gas;

$p_t \approx 0.53 p_2$ and $p_t$ is less than ps, wherein $p_3$ equals the back pressure exerted by said standing water column in said channel head and said U-tubes in communion therewith; and $t_2' = (2-t_1')$ and represents the pulse time-off period, with $t_1'$ representing the pulse time-on period.

10. The method according to claim 1, wherein said ratio is maintained by the introduction of said gas into at least one of the downwardly facing open ends of each of said U-tubes at a pressure of about 20 psig, and wherein said introduction of said gas is intermittently and repetitively performed at periodic intervals at a ratio of gas introduction pulse time-on to gas introduction pulse time-off ranging from about 0.075:1 to about 0.05:1.

11. The method according to claim 3, wherein said ratio is maintained by the introduction of said gas into at least one of the downwardly facing open ends of each of said U-tubes at a pressure of about 20 psig, and wherein said introduction of said gas is intermittently and repetitively performed at periodic intervals at a ratio of gas introduction pulse time-on to gas introduction pulse time-off ranging from about 0.07:1 to about 0.057:1.

12. The method according to claim 4, wherein said ratio is maintained by the introduction of said gas into at least one of the downwardly facing open ends of each of said U-tubes at a pressure of about 20 psig. and wherein said introduction of said gas is intermittently and repetitively performed at periodic intervals at a ratio of gas introduction pulse time-on to gas introduction pulse time-off of about 0.0634:1.

13. The method according to claim 1, wherein said ratio is maintained by the introduction of said gas into at least one of the downwardly facing open ends of each of said U-tubes wherein said introduction of said gas is intermittently and repetitively performed at periodic intervals at a ratio of gas introduction pulse time-on to gas introduction pulse time-off of about $t_1':t_2'$, and wherein:

$t_1$ = the pulse time-on period derived from empirical determinations of the delivery rate at a first preselected gas introduction pressure, to beneath said tubesheet, of $p_1$;

$t_1' = (p_1/p_2)t_1$ wherein $p_2$ is a second preselected pressure of gas introduction which is in excess of $p_1$. and is greater than the critical pressure ($p_t$) of said gas;

$p_t \approx 0.53p_2$ and $p_t$ is greater than $p_3$, wherein $p_3$ equals the back pressure exerted by said standing water column in said channel head and said U-tubes in communion therewith; and $t_2' = (1 - t_1')$ and represents the pulse time-off period, with $t_1'$ representing the pulse time-on period.

14. The method according to claim 1, wherein said ratio is maintained by the introduction of said gas into at least one of the downwardly facing open ends of each of said U-tubes wherein said introduction of said gas is intermittently and repetitively performed at periodic intervals at a ratio of gas introduction pulse time-on to gas introduction pulse time-off of about $t_1':t_2'$, and wherein:

$t_1$ = the pulse time-on period derived from empirical determinations of the delivery rate at a first preselected gas introduction pressure to beneath said tubesheet of $p_1$;

$t_1' = (20/p_2)t_1$ wherein $p_2$ is a second preselected pressure of gas introduction which is in excess of $p_1$, and is greater than the critical pressure ($p_t$) of said gas;

$P_1 \approx 0.53p_2$ and $p_t$ is greater than $p_3$, wherein $p_3$ equals the back pressure exerted by said standing water column in said channel head and said U-tubes in communion therewith; and $t_2' = (1 - t_1')$ and represents the pulse time-off period, with $t_1'$ representing the pulse time-on period.

15. The method according to claim 1, wherein said ratio is maintained by the introduction of said gas into at least one of the downwardly facing open ends of each of said U-tubes wherein said introduction of said gas is intermittently and repetitively performed at periodic intervals at a ratio as introduction final pulse time-on to gas introduction final pulse time-off of about $t_{21}':t_{22}'$, and wherein:

$t$ = the pulse time-on period derived from empirical determinations of the delivery rate at a first preselected gas introduction pressure, to beneath said tubesheet, of $p_1$;

$t_1' = (\sqrt{p_1}/\sqrt{p_2})t_1$ wherein $p_2$ is a second and intermediate preselected pressure of gas introduction which is in excess of $p_1$ and less than $p_3$;

$p_t \approx 0.53p_2$ is less than $p_4$, wherein $p_t$ represents the critical pressure ($p_t$) of said gas and wherein $p_4$ equals the back pressure exerted by said standing water column in said channel head and said U-tubes in communion therewith; and $t_2' = (1 - t_1')$ and represents the pulse time-off period, with $t_1'$ representing the pulse time-on period;

$t_{21} = t_1'$;

$t_{21}' = (2/p_3)t_{21}$ wherein $p_3$ is the final preselected pressure of gas introduction which is in excess of $p_2$;

$p_t' \approx 0.53p_3$, $p_t'$ is greater than $p_4$ and represents the critical pressure ($p_t'$) of said gas at introduction pressure ps;

$t_{22}' = (1 - t_{21}')$ and represents the final pulse time-off period, with $t_{21}'$ representing the final pulse time-on period.

16. The method according to claim 13, wherein $p_2$ ranges upwards from said $p_t$ to about 400 psig.

17. The method according to claim 14, wherein $p_2$ ranges upwards from said $p_t$ to about 400 psig.

18. The method according to claim 5, wherein said channel head has flow openings and wherein said gas is introduced via one of the flow openings for said water through the channel head adjacent to the lower end of said steam generator.

19. The method according to claim 5, wherein said gas is introduced through an opening in a manway attached to said channel head adjacent to the lower end of said steam generator.

20. The method according to claim 5, wherein said nuclear-powered steam generating system includes respective flow transmitters for detecting flow of said coolant water through said outlet conduit of each said steam generators, each said flow transmitter having a high-impulse reference tube and a low-impulse reference tube, both of which are attached to said outlet conduit of the steam generator, and wherein said gas is introduced via one of said flow transmitter impulse reference tubes associated with each said steam generator.

* * * * *

UNITED STATES PATENT AND TRADEMARK OFFICE
CERTIFICATE OF CORRECTION

PATENT NO.   : 5,000,908

DATED        : March 19, 1991

INVENTOR(S)  : Robert A. Petrusek

It is certified that error appears in the above-identified patent and that said Letters Patent is hereby corrected as shown below:

On the title page:
    In the Abstract line 21, "1.1" should be -- 1:1 --

Column 2, line 26, "thereover." should be -- thereover, --
Column 2, line 31, "methodologY" should be -- methodology --
Column 2, line 62, "system. Such" should be -- svstem, such --
Column 3, line 63, "of. and" should be -- of, and --
Column 3, line 66, "1987." should be -- 1987, --
Column 6, line 7, "supra." should be -- supra, --
Column 7, line 64, "Jawor." should be -- Jawor, --
Column 8, line 1, "0.0192:1. and" should be -- 0.0192:1, and --
Column 11, line 61, "less" should be -- legs --
Column 18, line 29, "($T_1$ are" should be -- ($T_1$) are --
Column 18, line 54, "$t_1:t_2=3.68/5642=0.0634$." should be --
    $t_1:t_2=3.58/56.42=0.0634$. --
Column 19, line 7, "time on" should be -- time-on --
Column 20, line 4, "Example 11" should be -- Example II --
Column 22, line 42, "gas. Such" should be -- gas, such --
Column 22, line 47, "time on" should be -- time-on --
Column 22, line 48, "time off" should be -- time-off --
Column 23, line 5, "figures. calculations" should be -- figures, calculations --
Column 23, line 34, "Example 11" should be -- Example II --
Column 23, line 50, "$t_1(\sqrt{p_1}/\sqrt{p_2})$" should be -- $t_1'=t_1(\sqrt{p_1}/\sqrt{p_2})$ --
Column 23, line 53, "after "optimum" insert -- $t_1:t_2$ ratio at various
    pressures of nitrogen delivery are as shown in --
Column 24, line 37, " vis-e,gra/a/ -vis" should be -- vis-à-vis --
Column 26, line 28, "of as" should be -- of gas --
Column 26, line 35, "$p_3$" should be -- $p_2$ --
Column 26, line 39, "$p_t \approx 0.53p_1$" should be -- $p_t \approx 0.53p_2$ --
Column 26, line 43, "$t_2'=(1-t')$" should be -- $t_2'=(1-t_1')$ --
Column 26, line 61 " ps" should be -- $p_3$ --
Column 26, line 65, "$t_2'=(2-t_1')$" should be -- $t_2'=(1-t_1')$ --
Column 28, line 12, "ratio as" should be -- ratio of gas --
Column 28, line 22, after "$p_t \approx 0.53p_2$" insert -- and $p_t$ --
Column 28, line 30, "$t_{21}'=(2/p_3)t_{21}$" should be -- $t_{21}'=(p_2/p_3)t_{21}$ --

UNITED STATES PATENT AND TRADEMARK OFFICE
CERTIFICATE OF CORRECTION

PATENT NO. : 5,000,908

DATED : March 19, 1991

INVENTOR(S) : Robert A. Petrusek

It is certified that error appears in the above-identified patent and that said Letters Patent is hereby corrected as shown below:

Column 28, line 34, "ps" should be -- $p_3$ --

Signed and Sealed this

Fifth Day of January, 1993

Attest:

DOUGLAS B. COMER

*Attesting Officer*    Acting Commissioner of Patents and Trademarks